US012284114B2

(12) United States Patent
Ekawde et al.

(10) Patent No.: US 12,284,114 B2
(45) Date of Patent: Apr. 22, 2025

(54) DYNAMIC STEERING FOR HTTP CALLS

(71) Applicant: MICROSOFT TECHNOLOGY LICENSING, LLC, Redmond, WA (US)

(72) Inventors: Kunal Anand Ekawde, Bengaluru (IN); Michael Anthony Brown, McKinney, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 390 days.

(21) Appl. No.: 17/469,112

(22) Filed: Sep. 8, 2021

(65) Prior Publication Data

US 2022/0400077 A1   Dec. 15, 2022

(51) Int. Cl.
*H04L 45/74* (2022.01)
*H04L 67/02* (2022.01)

(52) U.S. Cl.
CPC .............. *H04L 45/74* (2013.01); *H04L 67/02* (2013.01)

(58) Field of Classification Search
CPC ......... H04L 45/74; H04L 67/02; H04L 67/10; H04L 67/51
See application file for complete search history.

(56) References Cited

U.S. PATENT DOCUMENTS

| 2020/0112487 | A1* | 4/2020 | Inamdar | H04L 43/08 |
| 2020/0336553 | A1* | 10/2020 | Yeddula | H04L 41/22 |
| 2020/0366580 | A1* | 11/2020 | Sinha | H04L 67/1012 |
| 2021/0191706 | A1* | 6/2021 | Sn | G06F 11/3466 |

OTHER PUBLICATIONS

"International Search Report and Written Opinion Issued in PCT Application No. PCT/US22/036612", Mailed Date: Nov. 18, 2022, 14 Pages.

* cited by examiner

*Primary Examiner* — Gary Mui
*Assistant Examiner* — Yewon Kim
(74) *Attorney, Agent, or Firm* — Han Gim; Newport IP, LLC

(57) ABSTRACT

Techniques are disclosed for deploying, by a packet processing system in a cloud computing environment, microservice instances in the cloud computing environment comprising a plurality of computing devices executing a plurality of Kubernetes clusters comprising one or more containers. The packet processing system is configured to selectively steer data traffic between multiple versions of microservice instances executing in the cloud computing environment.

18 Claims, 5 Drawing Sheets

DYNAMIC STEERING FOR HTTP CALLS

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines or containers that appear and operate as independent computing resources. The data center can create, maintain or delete virtual machines or containers in a dynamic manner. Many platforms use Kubernetes as a container orchestration system for application deployment, scaling, and management. When introducing new versions of an application in a microservices-based Kubernetes cluster environment, it is often desirable to implement the deployment in a controlled manner. It is with respect to these considerations and others that the disclosure made herein is presented.

SUMMARY

When introducing new versions of an application in a microservices-based Kubernetes cluster environment, it is often desirable to implement a canary deployment where a controlled percentage of user traffic is shifted to a newer version of a microservice in the process of phasing out the older version. Kubernetes cluster operators can orchestrate canary deployments natively using labels and deployments. However, replica ratios must be controlled manually in order to limit traffic to the canary release. Deploying with an Istio service mesh can enable a separation between replica counts and traffic management. However, Istio is limited to traffic percentages and targets.

The present disclosure provides a way to selectively steer data traffic in a Kubernetes cluster environment to multiple versions of a microservice based on information in the data message. In this way, data traffic for a specified set of users can be steered to a specified microservice version. User traffic may be specified by adding a proprietary HTTP header which identifies the microservice application and version that the traffic should be steered to. The present disclosure includes addition of the fields that indicate the traffic steering mode (weighted canary upgrade or dynamic steering), the images that define which versions which will be used for the canary upgrade, and the HTTP header and values for tagging messages.

By providing such a selective steering approach, data centers may be enabled to provide granular and fine-tuned steering of user traffic to different microservice versions in large scale cloud environments based on header information in the messages, which in turn enables more controlled deployment and testing of new versions. This allows data centers to operate more efficiently, providing for greater operational efficiency for service providers.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
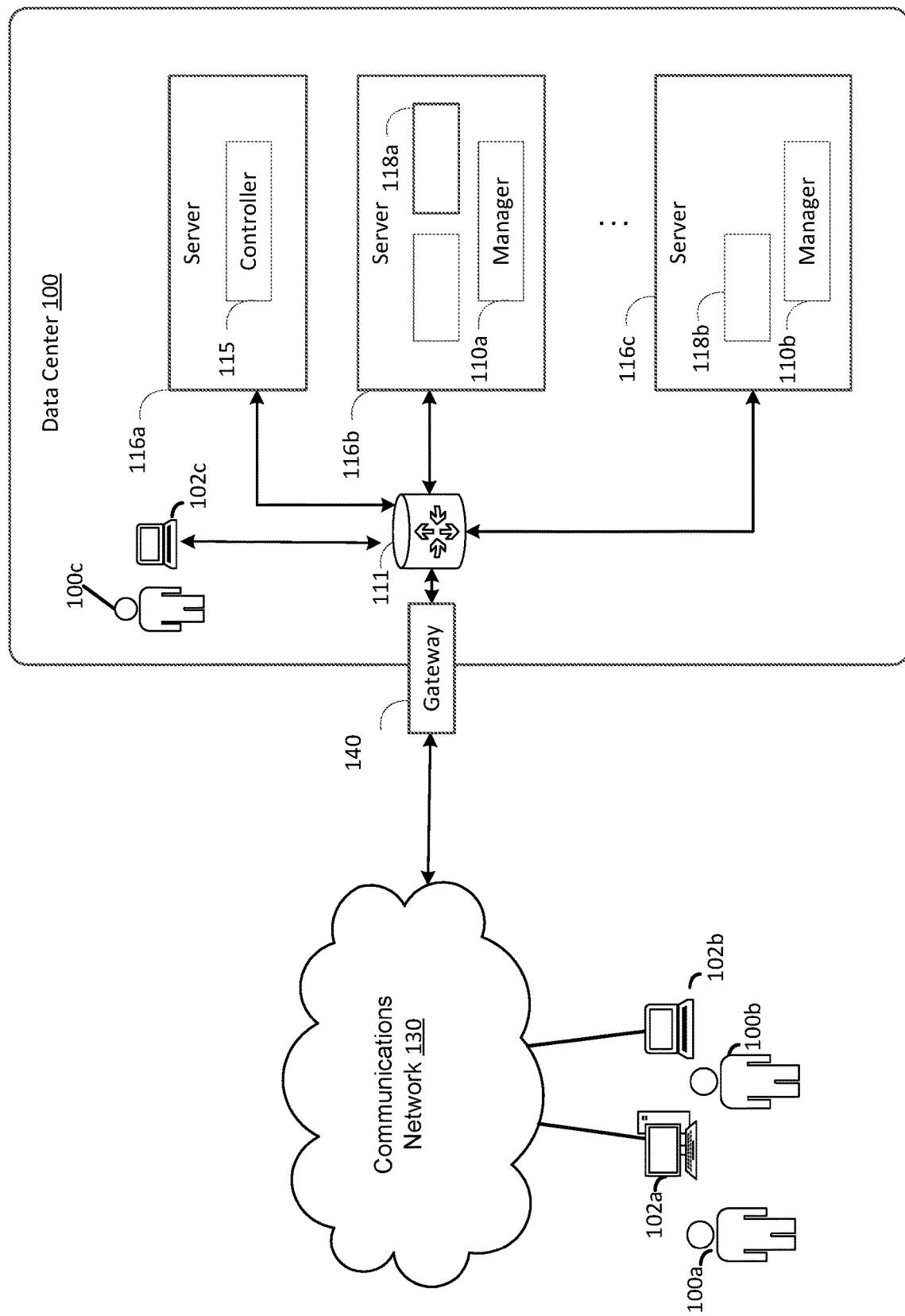
FIG. 1 is a diagram illustrating a data center in accordance with the present disclosure.

When introducing new versions of an application in a microservices-based Kubernetes cluster environment, it is often desirable to a implement a canary deployment where a controlled percentage of user traffic is shifted to a newer version of a microservice in the process of phasing out the older version. Kubernetes cluster operators can orchestrate canary deployments natively using labels and deployments. However, replica ratios must be controlled manually in order to limit traffic to the canary release. Deploying with an Istio service mesh can enable a separation between replica counts and traffic management. However, Istio is limited to traffic percentages and targets.

The invention provides a way to selectively steer data traffic in a Kubernetes cluster environment to multiple versions of a microservice based on information in the data message. In this way, data traffic for a specified set of users can be steered to a specified microservice version. User traffic may be specified by adding a proprietary HTTP header which identifies the microservice application and version that the traffic should be steered to. The invention includes addition of the fields that indicate the traffic steering mode (weighted canary upgrade or dynamic steering), the images that define which versions which will be used for the canary upgrade, and the HTTP header and values for tagging messages. The invention thus allows for granular and fine-tuned steering of user traffic to different microservice versions in large scale cloud environments based on header information in the messages, which in turn enables more controlled deployment and testing of new versions.

For example, when deploying a new software version, it may be desirable to steer a specified set of users to the new version before making the new version available to all users. For example, it may be desirable to initially only allow users at a specified service level to be able to access the new software version. Weight steering methods do not provide such fine-tuned level of control. For example, a purely weight distribution may randomly distribute traffic to the new version as long as the actual observed traffic proportion between variants/branches is consistent with the desired weight. For example, for two variants, the desired ratio may be 30% to 70%.

By implementing the disclosed embodiments, more granular control of data traffic steering may be provided as compared to weighting the distribution between two versions (e.g., 30%/70%). For example, data traffic may be based on policies and can be applied on a per packet basis, per user basis, or other steering criteria.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

FIG. 1 illustrates one example of a general computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a,102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines or containers. The virtual machines or containers may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances or containers, such as container instances, virtual machine instances, or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines or containers 118a and 118b (which may be referred to herein singularly as "a virtual machine 118" or in the plural as "the virtual machines 118" or as "a container 118" or in the plural as "the containers 118"). The virtual machines or containers 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines or containers on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a,102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a,102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines or containers 118 on servers 116, for example.

It should be appreciated that although the embodiments disclosed above are discussed in the context of virtual machines and containers, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The disclosed embodiments may be implemented in a mobile edge computing (MEC) environment implemented in conjunction with a 4G, 5G, or other cellular network. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

Figure 2:
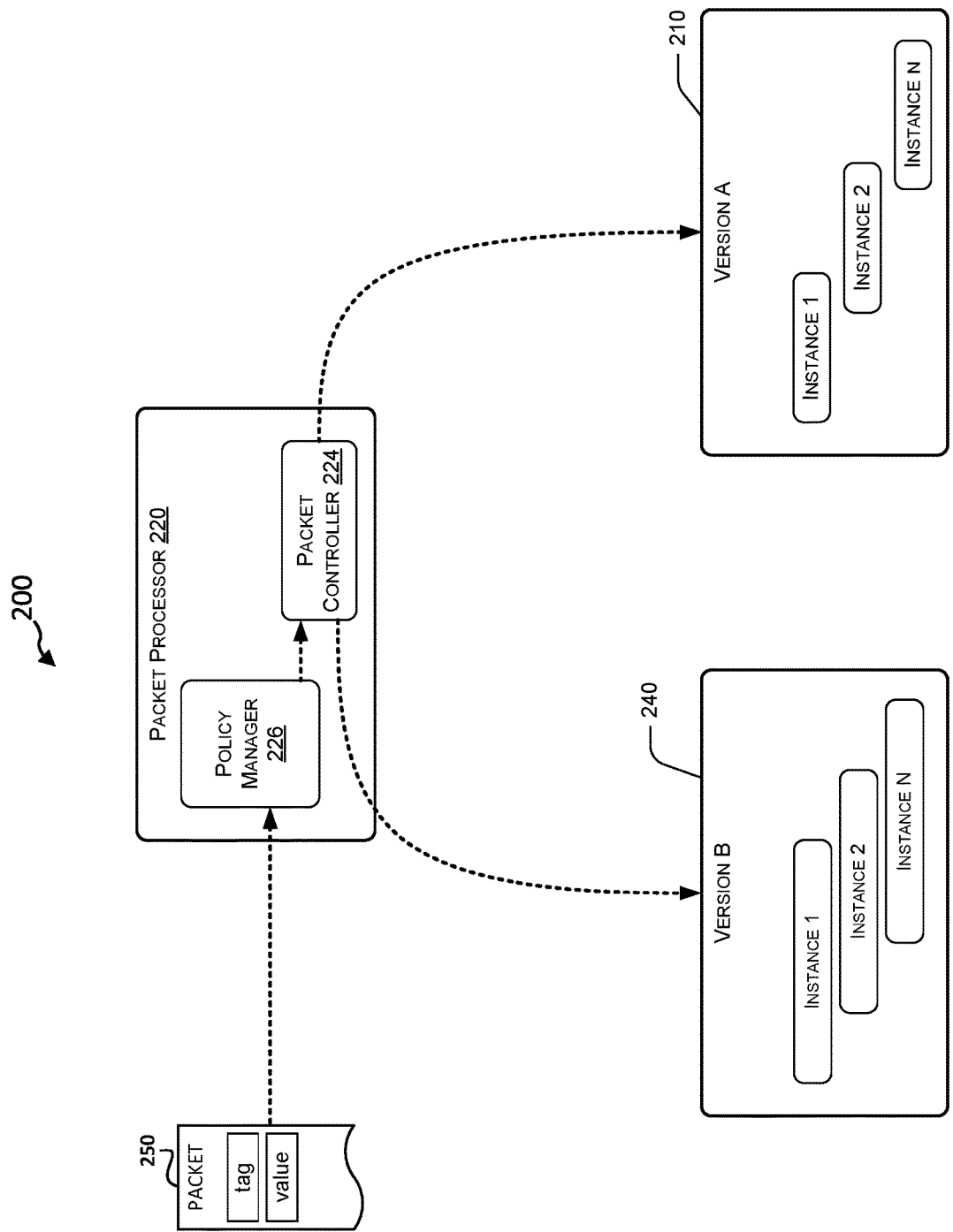
FIG. 2 illustrates an example of a distributed timer in accordance with the present disclosure.

Referring to FIG. 2, illustrated is an example environment 200 where the disclosed techniques can be implemented. FIG. 2 illustrates a packet processor 220 that may include a policy manager 226 and packet controller 224. The packet processor 220 may receive a packet 250 that includes a header with a tag and value. The policy manager 226 may process the header of packet 250 to match the packet to an appropriate policy. The policy manager 226 may read the header to determine that the packet should be forwarded to a microservice. The policy manager 226 may read the tag and value of packet 250 to determine that the packet should be forwarded to either Version A or Version B of the microservice, as set forth in the policy associated with the packet. The packet controller 224 may forward the packet to the identified version, after the packet has completed processing.

In various network scenarios, packet processor 220 may operate on packets received from the network by applying a sequence of rules to the packet. For example, packet processor 220 may apply various operations on packets, such as specific networking policies and transform or tunnel data packets. The packet processor 220 may include a central data packet processor (not shown) that performs the processing of data packets. The packet processing layers may include, for example, those relating to metering, access control lists, VNet addressing/routing, and other various functions which may include, for example, those pertaining to routing, tunneling, filtering, address translation, encryption, decryption, encapsulation, de-encapsulation, quality of service (QoS), and the like. The packet processor 220 may evaluate the packets as they traverse the networking policy layers, matching rules in each layer based on a state of the packet after an action is performed in the preceding layer.

The disclosed embodiments provide a way to selectively distribute data traffic to different microservice versions or deployments running. Furthermore, the disclose embodiments provide a way to selectively steer traffic based on information contained in the packet itself. This enables, for example, traffic for a selected set of users to new version of software prior to making the new software available to all users. In one implementation, specified users may be tagged by adding a proprietary HTTP header, which can be used to steer selected traffic to the new or current version of software.

In some embodiments, the tags may be specific to a condition or application. In some embodiments, the application can specify the HTTP header and tag values.

The following is one example list of steps to selectively steer traffic in accordance with this disclosure:

1. Enable selective canary upgrade and install
   pod-function:
      enabled: true
      upgrade:
         canary: true
         trafficSteeringMode: selective #[weighted|selective|none]
         canaryVersWeight: 0
         stableVersWeight: 0
         stableVersion: 0.0.1
         stableInfraImage: "xxx:2.1.0-660"
         stableWorkerImage: "yyy:2.1.0-1590"
         httpMatch:
            header: x-group-tag
            condition: exact
            value: red
      deployment:
         replicas: 1
         traceLogEnabled: "false"

trafficSteeringMode may indicate the steering mode. "weighted" may refer to a weighted canary upgrade where traffic distribution is based on specified weights. If weighted canary upgrade is used, "weighted" may be used as the value.

stableInfraImage, stableWorkerImage may specify the images which will be used for the canary upgrade. Tagged users may have their data sent to the new version.

httpMatch may provide the ability to specify the HTTP header and the value to tag the message and to check at istio-proxy.

Below is an example of an application tagging only the first 10 messages with the tag specified in httpMatch. In some embodiments, the application, based on business logic, customer requirements, or resilient handling, may set the HTTP tag in lieu of the environment variable.

2. Update environment variable at deployment
   name: MAX_CUSTOM_HEADER_MSGS
   value: "10"→This indicates that the first 10 messages will be tagged with that HTTP header and value.

3. Run calls, greater in number than the value specified in environment value

For example, after running 15 calls, it can be observed that 10 calls were made to the new specified images and 5 calls to the existing version.

Figure 3:
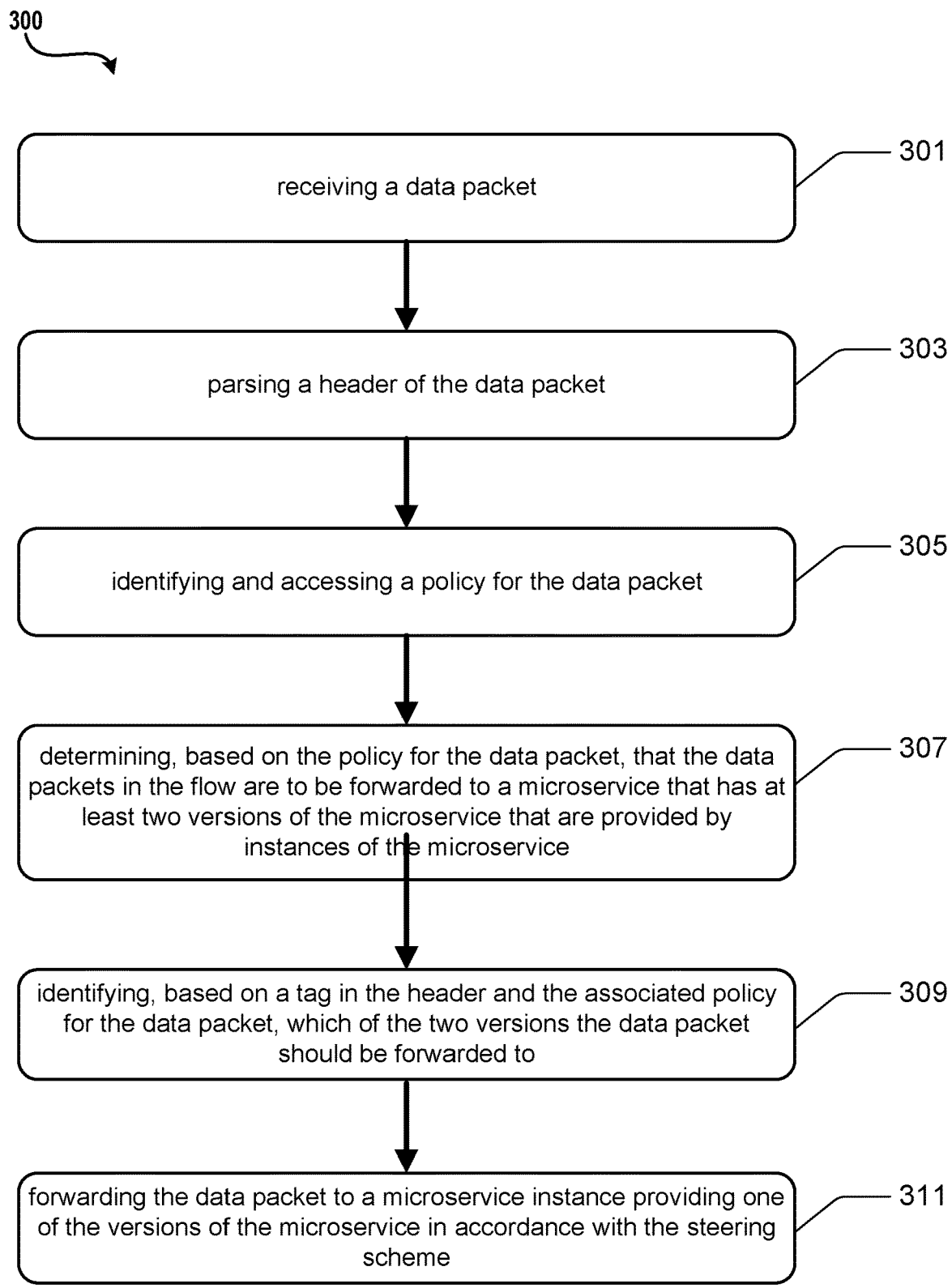
FIG. 3 is a flowchart depicting an example procedure for providing a distributed timer in accordance with the present disclosure.

Turning now to FIG. 3, illustrated is an example operational procedure for deploying, by a packet processing system in a cloud computing environment, microservice instances in the cloud computing environment. The cloud computing environment comprises a plurality of computing devices executing a plurality of Kubernetes clusters comprising one or more containers. In an embodiment, the packet processing system configured to selectively steer data traffic between multiple versions of microservice instances executing in the cloud computing environment. Such an operational procedure can be provided by one or more components illustrated in FIGS. 1 and 2. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 3, operation 301 illustrates receiving, by the packet processing system, a data packet.

Operation 301 may be followed by operation 303. Operation 303 illustrates parsing a header of the data packet.

Operation 303 may be followed by operation 305. Operation 305 illustrates based on the header, identifying and accessing a policy for the data packet. In an embodiment, the policy is specific to a user associated with the data packet and indicates how the data packet and data packets in a same flow are to be processed.

Operation 305 may be followed by operation 307. Operation 307 illustrates determining, based on the policy for the data packet, that the data packets in the flow are to be forwarded to a microservice that has at least two versions of the microservice that are provided by instances of the microservice.

Operation 307 may be followed by operation 309. Operation 309 illustrates identifying, based on a tag in the header and the policy for the data packet, which of the two versions the data packet should be forwarded to. In an embodiment, the tag indicates that the data packet is to be steered between multiple versions, and a steering scheme for the data packet.

Operation 309 may be followed by operation 311. Operation 311 illustrates forwarding, by the packet processing system, the data packet to a microservice instance providing one of the versions of the microservice in accordance with the steering scheme.

Figure 4:
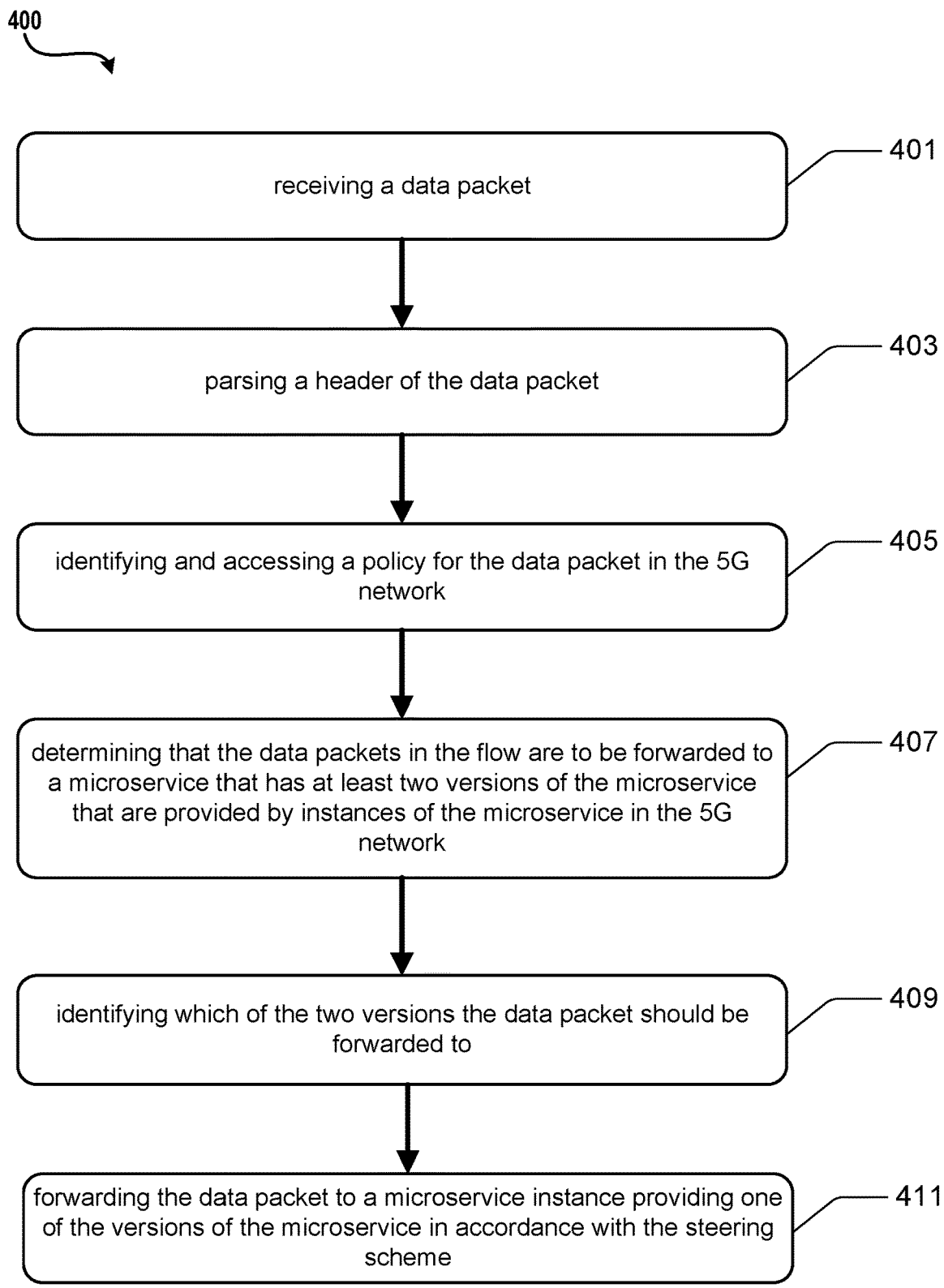
FIG. 4 is a flowchart depicting an example procedure for providing a distributed timer in accordance with the present disclosure.

Referring to FIG. 4, illustrated is another example operational procedure for deploying, by a packet processing system, an event timer for event synchronization in a 5G network comprising a plurality of computing devices hosting a plurality of clusters comprising one or more containers. In an embodiment, the packet processing system is configured to selectively steer data traffic between multiple versions of microservice instances executing in the 5G network. Such an operational procedure can be provided by services shown in FIGS. 1 and 2. The operational procedure may be implemented in a system comprising one or more computing devices. Referring to FIG. 4, operation 401 illustrates receiving, by the packet processing system, a data packet.

Operation 401 may be followed by operation 403. Operation 403 illustrates parsing a header of the data packet.

Operation 403 may be followed by operation 405. Operation 405 illustrates based on the header, identifying and accessing a policy for the data packet in the 5G network. In an embodiment, the policy is specific to a user associated with the data packet and indicates how the data packet and data packets in a same flow are to be processed.

Operation 405 may be followed by operation 407. Operation 407 illustrates determining, based on the policy for the data packet, that the data packets in the flow are to be forwarded to a microservice that has at least two versions of the microservice that are provided by instances of the microservice in the 5G network.

Operation 407 may be followed by operation 409. Operation 409 illustrates identifying, based on a tag in the header and the policy for the data packet, which of the two versions the data packet should be forwarded to. In an embodiment, the tag indicates:
   that the data packet is to be steered between multiple versions; and
   a steering scheme for the data packet.

Operation 409 may be followed by operation 411. Operation 411 illustrates forwarding, by the packet processing system, the data packet to a microservice instance providing one of the versions of the microservice in accordance with the steering scheme.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium.

While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 5:
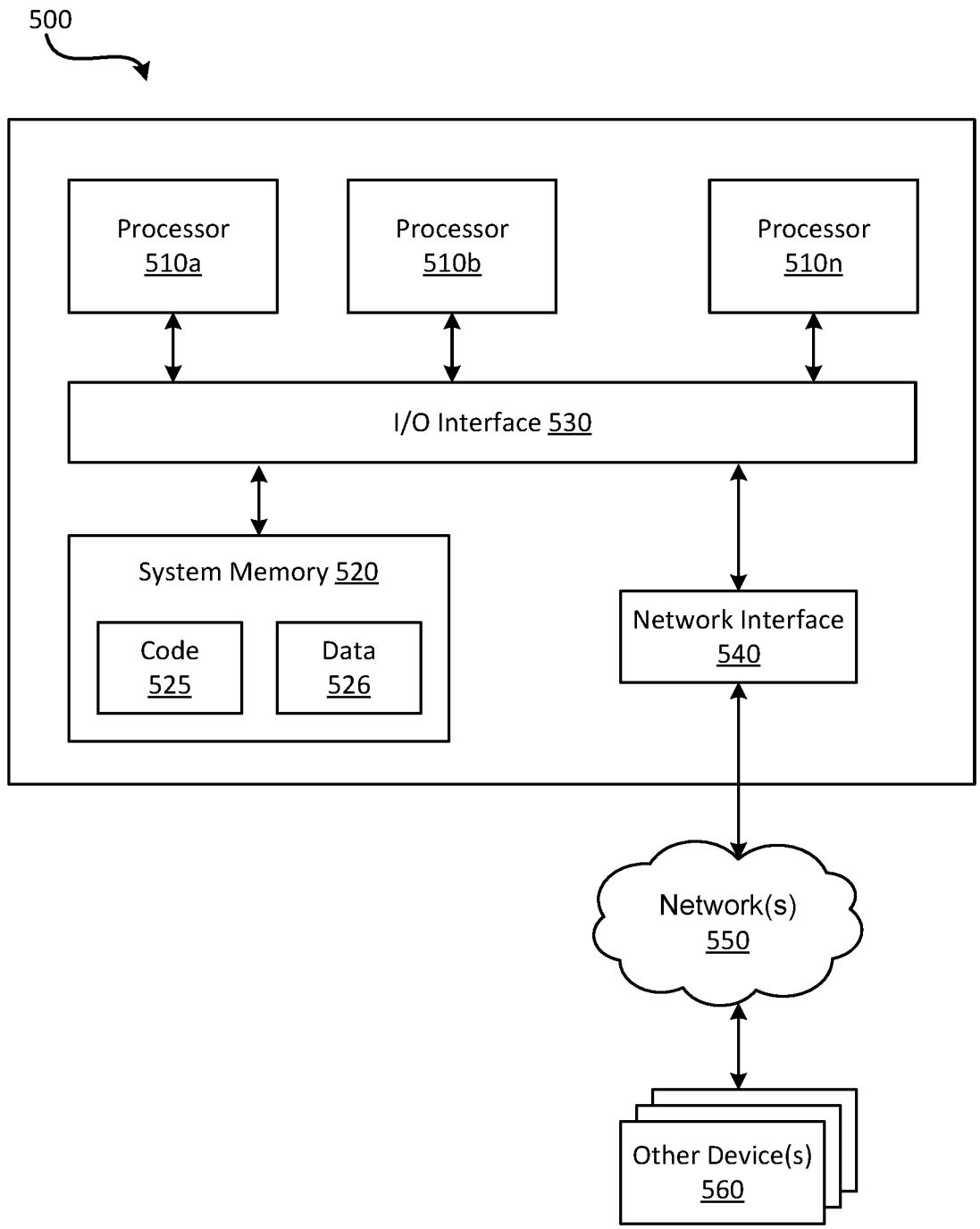
FIG. 5 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 5 illustrates such a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x56, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 may be configured to coordinate I/O traffic between the processor 510, system memory 520, and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components. Also, in some embodiments some or all of the functionality of I/O interface 530, such as an interface to system memory 520, may be incorporated directly into processor 510.

Network interface 540 may be configured to allow data to be exchanged between computing device 500 and other device or devices 560 attached to a network or network(s) 550, such as other computer systems or devices as illustrated in FIGS. 1 through 4, for example. In various embodiments, network interface 540 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs or via any other suitable type of network and/or protocol.

In some embodiments, system memory 520 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for deploying, by a packet processing system in a cloud computing environment, microservice instances in the cloud computing environment, the cloud computing environment comprising a plurality of computing devices executing a plurality of Kubernetes clusters comprising one or more containers, the packet processing system configured to selectively steer data traffic between multiple versions of microservice instances executing in the cloud computing environment, the method comprising:

receiving, by the packet processing system, a data packet;
    parsing a header of the data packet,
    based on the header, identifying and accessing a policy for the data packet, wherein the policy is specific to a user associated with the data packet and indicates how the data packet and data packets in a same flow are to be processed;
    determining, based on the policy for the data packet, that the data packets in the flow are to be forwarded to a microservice that has at least two versions of the microservice that are provided by instances of the microservice;
    identifying, based on a tag in the header and the policy for the data packet, which of the two versions the data packet should be forwarded to, wherein the tag indicates:
    that the data packet is to be steered between multiple versions; and
    a steering scheme for the data packet; and
    forwarding, by the packet processing system, the data packet to a microservice instance providing one of the versions of the microservice in accordance with the steering scheme.

Clause 2: The method of clause 1, wherein the header is an HTTP header.

Clause 3: The method of any of clauses 1-2, wherein the steering scheme is based on a user associated with the data packet.

Clause 4: The method of any of clauses 1-3, wherein the steering scheme is based on the policy associated with the data packet.

Clause 5: The method of any of clauses 1-4, further comprising:

identifying, based on the tag in the header, which of three versions the data packet should be forwarded to; and
    forwarding, by the packet processing system, the data packet to a microservice instance providing the identified version.

Clause 6: The method of any of clauses 1-5, wherein distribution between two versions is a weighted canary distribution.

Clause 7: The method of clauses 1-6, wherein the version is identified based on service level of a user associated with the data packet.

Clause 8: The method of any of clauses 1-7, wherein distribution between the two versions is modified over a time period.

Clause 9: A method for deploying, by a packet processing system, microservice instances in a 5G network comprising a plurality of computing devices hosting a plurality of clusters comprising one or more containers, packet processing system configured to selectively steer data traffic between multiple versions of microservice instances executing in the 5G network, the method comprising:

receiving, by the packet processing system, a data packet;
    parsing a header of the data packet,
    based on the header, identifying and accessing a policy for the data packet in the 5G network, wherein the policy is specific to a user associated with the data packet and indicates how the data packet and data packets in a same flow are to be processed;
    determining, based on the policy for the data packet, that the data packets in the flow are to be forwarded to a microservice that has at least two versions of the microservice that are provided by instances of the microservice in the 5G network;
    identifying, based on a tag in the header and the policy for the data packet, which of the two versions the data packet should be forwarded to, wherein the tag indicates:
    that the data packet is to be steered between multiple versions; and
    a steering scheme for the data packet; and
    forwarding, by the packet processing system, the data packet to a microservice instance providing one of the versions of the microservice in accordance with the steering scheme.

Clause 10: The method of clause 9, wherein the header is an HTTP header.

Clause 11: The method of any of clauses 9 and 10, wherein the header includes a tag and value.

Clause 12: The method of any clauses 9-11, wherein the version is further identified based on a user associated with the data packet.

Clause 13: The method of any clauses 9-12, wherein the version is further identified based on the policy associated with the data packet.

Clause 14: The method of any clauses 9-13, wherein distribution between the two versions is a weighted canary distribution r.

Clause 15: The method of any clauses 9-14, wherein the version is identified based on service level of a user associated with the data packet.

Clause 16: A computer-readable storage medium having computer-executable instructions stored thereupon which, when executed by one or more processors of a computing device, cause the computing device to:

receiving a data packet;
    parsing a header of the data packet,
    based on the header, identifying and accessing a policy for the data packet, wherein the policy is specific to a user associated with the data packet and indicates how the data packet and data packets in a same flow are to be processed;
    determining, based on the policy for the data packet, that the data packets in the flow are to be forwarded to a microservice that has at least two versions of the microservice that are provided by instances of the microservice;
    identifying, based on a tag in the header and the policy for the data packet, which of the two versions the data packet should be forwarded to, wherein the tag indicates:
    that the data packet is to be steered between multiple versions; and
    a steering scheme for the data packet; and
    forwarding the data packet to a microservice instance providing one of the versions of the microservice in accordance with the steering scheme.

Clause 17: The computer-readable storage medium of clause 16, wherein the header is an HTTP header.

Clause 18: The computer-readable storage medium of any of clauses 16 and 17, wherein the version is identified based on a user associated with the data packet.

Clause 19: The computer-readable storage medium of any of the clauses 16-18, wherein the version is identified based on a user associated with the data packet.

Clause 20: The computer-readable storage medium of any of the clauses 16-19, wherein the version is identified based on service level of a user associated with the data packet.

What is claimed is:

1. A method for deploying, by a packet processing system in a cloud computing environment, microservice instances in the cloud computing environment, the cloud computing environment comprising a plurality of computing devices executing a plurality of Kubernetes clusters comprising one or more containers, the packet processing system configured to selectively steer data traffic between multiple versions of microservice instances executing in the cloud computing environment, the method comprising:

receiving, by the packet processing system, a data packet;
parsing a header of the data packet,
based on the header, identifying and accessing a policy for the data packet, wherein the policy is specific to a user associated with the data packet and indicates how the data packet and data packets in a same flow are to be processed;
determining, based on the policy for the data packet, that the data packets in the flow are to be forwarded to a microservice that has at least two versions of the microservice that are provided by instances of the microservice;
identifying, based on a tag in the header and the policy for the data packet, which of the two versions the data packet should be forwarded to, wherein the tag indicates:
that the data packet is to be steered between multiple versions;
a steering scheme for the data packet indicating whether the data packet is to be distributed using a weighted canary distribution or dynamic distribution; and
which version of the microservice to which the data packet is to be steered; and
forwarding, by the packet processing system, the data packet to a microservice instance providing one of the versions of the microservice in accordance with the weighted canary distribution or dynamic distribution as indicated by the steering scheme.

2. The method of claim 1, wherein the header is an HTTP header.

3. The method of claim 1, wherein the steering scheme is based on a user associated with the data packet.

4. The method of claim 1, wherein the steering scheme is based on the policy associated with the data packet.

5. The method of claim 1, further comprising:
identifying, based on the tag in the header, which of three versions the data packet should be forwarded to; and
forwarding, by the packet processing system, the data packet to a microservice instance providing the identified version.

6. The method of claim 1, wherein the version is identified based on service level of a user associated with the data packet.

7. The method of claim 1, wherein distribution between the two versions is modified over a time period.

8. A method for deploying, by a packet processing system, microservice instances in a 5G network comprising a plurality of computing devices hosting a plurality of clusters comprising one or more containers, packet processing system configured to selectively steer data traffic between multiple versions of microservice instances executing in the 5G network, the method comprising:

receiving, by the packet processing system, a data packet;
parsing a header of the data packet,
based on the header, identifying and accessing a policy for the data packet in the 5G network, wherein the policy is specific to a user associated with the data packet and indicates how the data packet and data packets in a same flow are to be processed;
determining, based on the policy for the data packet, that the data packets in the flow are to be forwarded to a microservice that has at least two versions of the microservice that are provided by instances of the microservice in the 5G network;
identifying, based on a tag in the header and the policy for the data packet, which of the two versions the data packet should be forwarded to, wherein the tag indicates:
that the data packet is to be steered between multiple versions;
a steering scheme for the data packet, the steering scheme indicating whether the data packet is to be distributed using a weighted canary distribution or dynamic distribution; and
which version of the microservice to which the data packet is to be steered; and
forwarding, by the packet processing system, the data packet to a microservice instance providing one of the versions of the microservice in accordance with the weighted canary distribution or dynamic distribution as indicated by the steering scheme.

9. The method of claim 8, wherein the header is an HTTP header.

10. The method of claim 8, wherein the header includes a tag and value.

11. The method of claim 8, wherein the version is further identified based on a user associated with the data packet.

12. The method of claim 8, wherein the version is further identified based on the policy associated with the data packet.

13. The method of claim 8, wherein the version is identified based on service level of a user associated with the data packet.

14. A computer-readable storage medium having computer-executable instructions stored thereupon which, when executed by one or more processors of a computing device, cause the computing device to:

receiving a data packet;
parsing a header of the data packet,
based on the header, identifying and accessing a policy for the data packet, wherein the policy is specific to a user associated with the data packet and indicates how the data packet and data packets in a same flow are to be processed;
determining, based on the policy for the data packet, that the data packets in the flow are to be forwarded to a microservice that has at least two versions of the microservice that are provided by instances of the microservice;
identifying, based on a tag in the header and the policy for the data packet, which of the two versions the data packet should be forwarded to, wherein the tag indicates:
that the data packet is to be steered between multiple versions;

a traffic steering mode for the data packet, the traffic steering mode indicating a weighted canary upgrade or dynamic steering; and which version of the microservice to which the data packet is to be steered; and forwarding the data packet to a microservice instance providing one of the versions of the microservice in accordance with the weighted canary upgrade or dynamic steering as indicated by the traffic steering mode.

15. The computer-readable storage medium of claim 14, wherein the header is an HTTP header.

16. The computer-readable storage medium of claim 15, wherein the version is identified based on a user associated with the data packet.

17. The computer-readable storage medium of claim 14, wherein the version is identified based on a user associated with the data packet.

18. The computer-readable storage medium of claim 17, wherein the version is identified based on service level of a user associated with the data packet.

* * * * *